INVENTOR.
JANIS A. SIRONS
BY Wade Kuntz
ATTORNEY
Eugene J. Pawlikowski
AGENT

Jan. 2 1968  J. A. SIRONS  3,361,989
SOLID STATE OPTICAL LASER
Filed March 9, 1964  7 Sheets-Sheet 5

Fig-8

INVENTOR.
JANIS A. SIRONS
BY
ATTORNEY
AGENT

Jan. 2 1968   J. A. SIRONS   3,361,989
SOLID STATE OPTICAL LASER
Filed March 9, 1964   7 Sheets-Sheet 6

INVENTOR.
JANIS A. SIRONS
BY
ATTORNEY
Eugene J. Pawlikowski
AGENT

United States Patent Office 3,361,989
Patented Jan. 2, 1968

3,361,989
SOLID STATE OPTICAL LASER
Janis A. Sirons, Springfield, Ohio, assignor to the United States of America as represented by the Secretary of the Air Force
Filed Mar. 9, 1964, Ser. No. 350,618
9 Claims. (Cl. 331—94.5)

The invention described herein may be manufactured and used by or for the United States Government for governmental purposes without payment to me of any royalty thereon.

This invention relates to lasers, an acronym for light amplification by the stimulated emission of radiation and, particularly, to a laser device having improvements resulting in lower operating temperature for the crystal and greater efficiency in optically stimulating the crystal with pumping light.

Solid state lasers generally have a structure in which, essentially, a rod of active material capable of the stimulated emission of coherent light has end faces which are plane, parallel and coated to enhance internal reflection. The remainder of the rod is left clear to admit irradiating light from one or more flashlamps whose excitation raises the ion energy level to various higher levels. The operation of raising the ion energy to produce desired photon emission in the art is generally called "optical pumping." In going to a higher energy level the ions absorb energy and in returning to a lower level they emit this energy. In the case of ruby, it is convenient to consider three energy levels. The energy of the ions is raised from the lower or ground level to the higher of the three levels by the light irradiation. A radiationless transition of some ions then occurs from the highest level to an intermediate level with yet other ions leaving the highest level directly for the lowest level. In the transition from the intermediate level to the lowest level, the ions radiate light and this transition is the source of the coherent light produced by the laser. This light travels axially in the rod to be amplified by stimulated emission. Strong reinforcement of each radiated photon produces further photon stimulation at the same wavelength giving a very intense collimated beam occupying a relatively narrow portion of the wavelength spectrum. The laser output beam then escapes through a partially transmitting end surface of the laser crystal.

A very troublesome problem encountered in laser development is the relatively high threshold of pumping power required to produce impressive intensification in the laser beam. Internal heating effects are another problem since usually a substantial part of the pumping power appears in the crystal as heat. Any thermal instability therefore must be held to a minimum in order to avoid serious damage to the crystal itself. In cases of prolonged overheating, deterioration of the crystal can reach the point where operation will effectively cease. Generally accompanying efforts to stabilize the temperature of the crystal are a reduction in the threshold rate and an increase in radiation efficiency.

One object of the invention is to provide a laser with improved pumping efficiency and greater utilization of the crystal material.

Another object of the invention is the provision of a laser employing separate cooling systems, one liquid and the other gas, for the laser crystal and the source of pumping light, respectively.

A further object of the invention is to provide a laser in which a liquid coolant employed to bathe the laser crystal has the secondary advatage of contributing to the light per unit area focused on the crystal.

Still another object of the invention is the provision of a laser with a housing which is conveniently assembled and disassembled, thereby making the elements which form the resonator cavity conveniently accessible.

To carry the foregoing objects into effect, the laser device embodying the invention comprises a structure of concentrically arranged elements, the innermost of which is a solid laser rod capable of the emission of coherent light under proper illumination by a source of diffused radiating light. A transparent coolant in liquid form flows directly over the outer surface of the rod between the rod and a transparent tube of annular cross section. Refractive indexes for the tube and the coolant are selected such that the refractive product substantially increases the effective brightness of the irradiating source when viewing the source from the rod. As seen by the rod, the effective diameter of the source is increased, which gives sharper focusing than in the case where such interposition is not used. In an optical sense, the combined overlay may be considered a lens proportioned to focus the irradiation onto the laser rod. The overlay establishes a path of good heat conductivity away from the rod since all of its exposed surfaces are irrigated by the coolant. To prevent the formation of frost on the outer surface of the transparent tube the cavity outside the tube is swept with a dry, warm nitrogen gas to purge that interior of moisture content. Formation of frost on the end face of the laser rod from which the coherent light emerges is also prevented. In a modification of the invention, the wall of the housing may comprise arcuate cover plates so shaped that when attached to one another in abutting relation about a circumferential arrangement of support ribs a rigid tubular shell is formed. This construction is very useful since the cover plates may be removed radially one at a time to permit access to any section of the resonant cavity.

A complete understanding of the invention and an introduction to other objects and features not specifically mentioned may be had during the course of the description when read in conjunction with the accompanying drawings, wherein like reference numerals refer to like parts in the several views, and wherein:

FIG. 12 is an enlargement of certain parts shown in FIG. 2;

Figures 1, 6, 7:
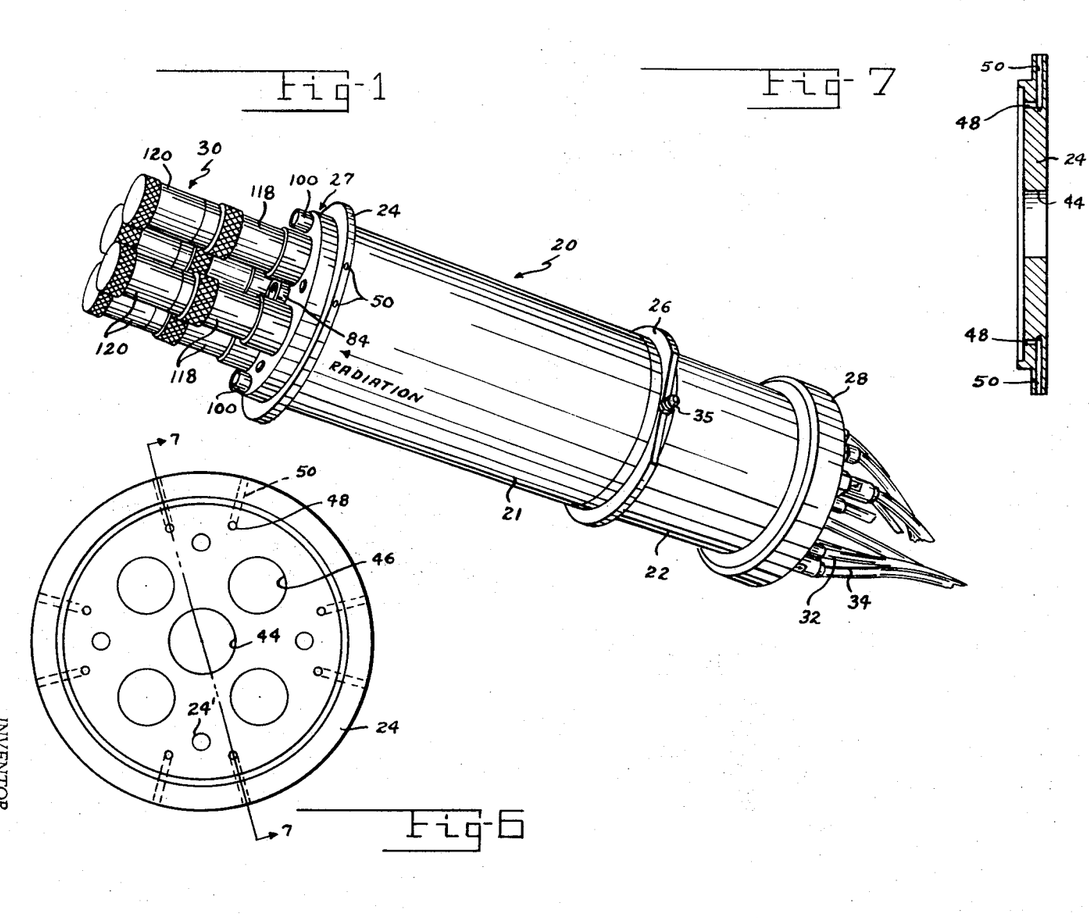
FIG. 1 is a perspective view of the laser device according to the invention.
FIG. 6 is a detail elevation of one of the end members.
FIG. 7 is a sectional view on line 7—7 of FIG. 6.

Referring now to FIG. 1, the laser device embodying the invention, generally referenced 20, has several major parts which prominently appear when the device is viewed externally. These include tandem housings 21 and 22 of different lengths, and members 24 and 26 of lightweight metal, such as aluminum, the latter securing housings 21 and 22 in concentric relation, a perforate disc-shaped member 27 at one end of device 20 which rests adjacent end member 24, and a cap screw 28 at the opposite end of device 20 threaded onto housing 22. Removably attached cover members 30 generally of cylindrical shape offer protection for the sources of irradiation used to excite the laser rod. Appropriate coaxial lines 32 and 34 are for connection to suitable trigger and pumping voltages, respectively. A pipe coupling 35 depends from the rim of end member 26 for attachment to a pressurized source of a dry and transparent gas, such as nitrogen, for a use to be described below. The output beam of device 10 emerges in the direction shown by the radiation arrow on housing 21.

Figures 2, 3:
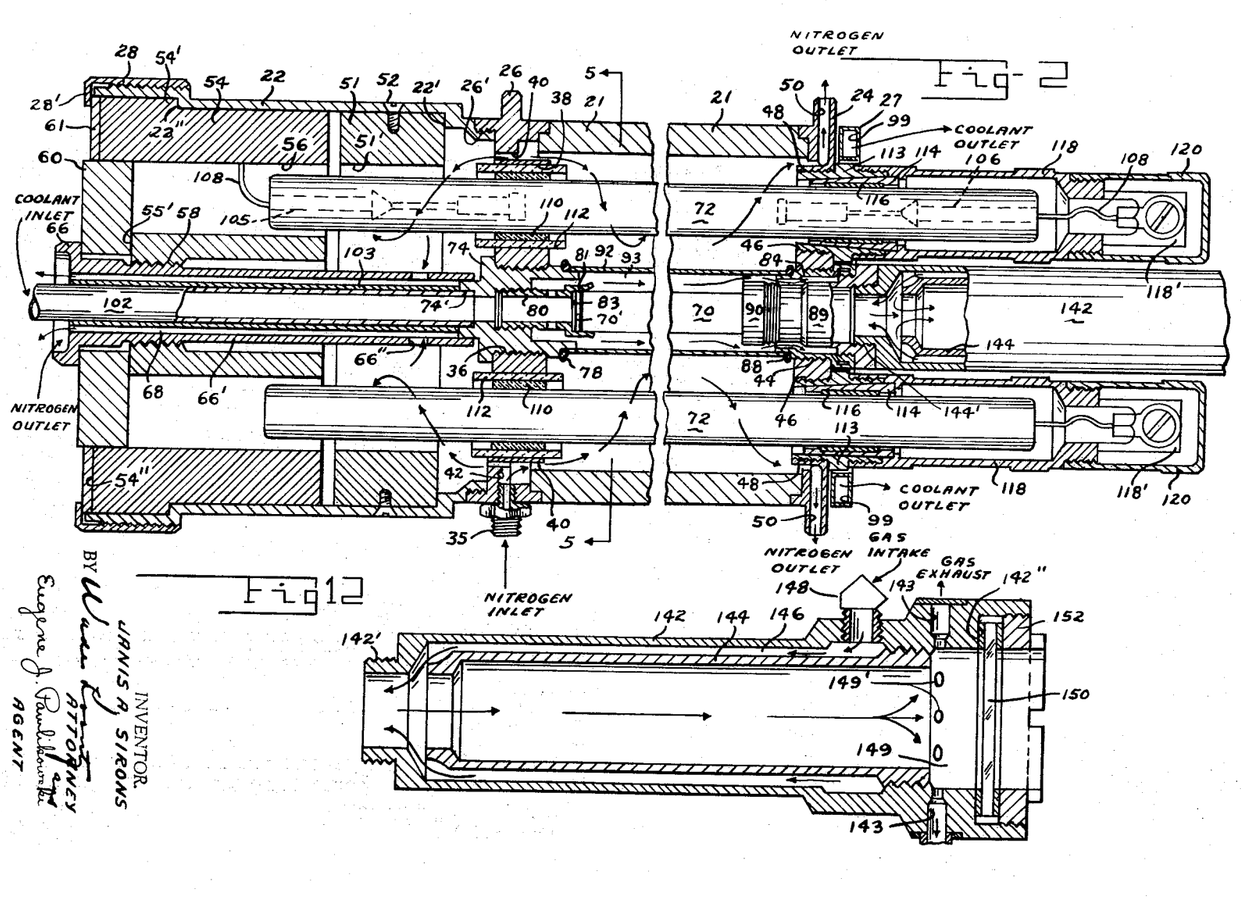
FIG. 2 is a sectional view in elevation, along the longitudinal axis of the device of FIG. 1.
FIG. 3 is an exploded view showing the relationship of certain major parts of the device of FIG. 1.
Figure 3:
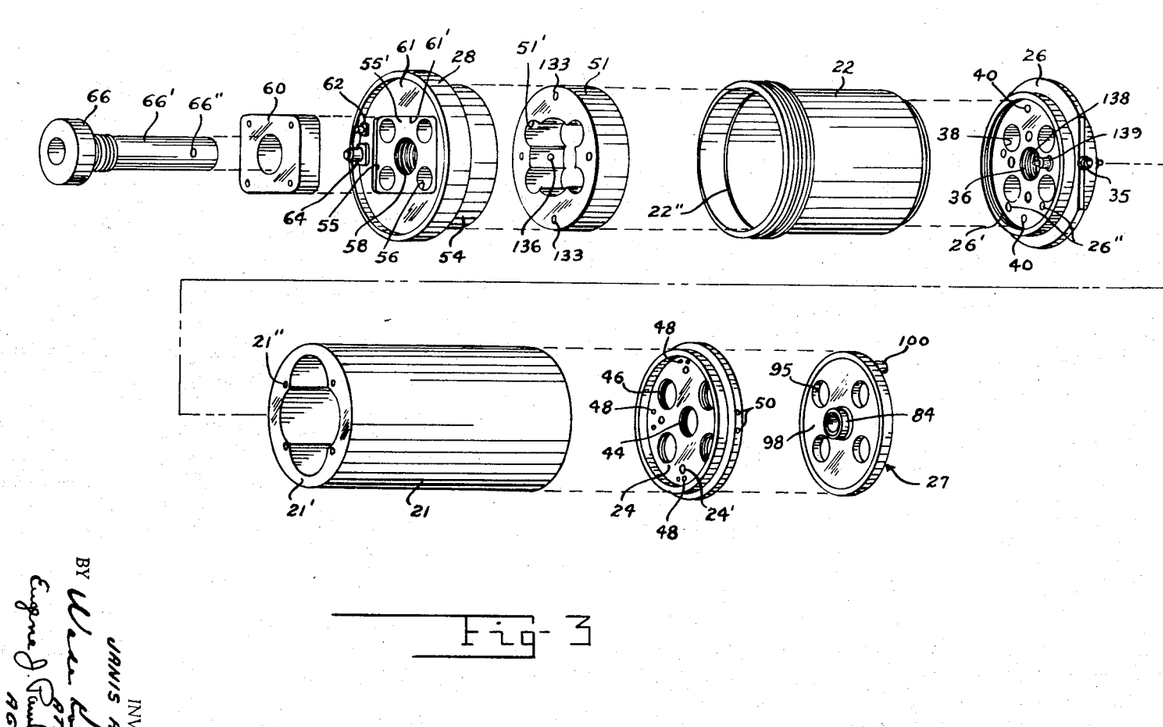

In FIGS. 2 and 3, the positions of housings 21 and 22 are reversed from the order shown in FIG. 1. Thus, looking toward the left of FIG. 2, cap screw 28 threadably engages housing 22. A central opening in cap screw 28 is easily defined by the downturned extremity 28'. The opposite end of housing 22 turns into an internal thread 26' on end member 26.

One end face 21' of housing 21 is provided with angularly-spaced holes 21" (FIG. 3) aligned with similarly arranged axial holes 26" bored through end member 26. Suitable screws (not shown) enter or pass through holes 26" in end member 26 and, when turned sufficiently into holes 21" in housing 21, draw end members 26 to bear snugly against end face 21'.

Extensively perforate in construction, end member 26 is provided with a threaded coaxial hole 36, unthreaded holes 38 arranged about the center hole 36, and axial apertures 40 which extend through end member 36 from one side to the other. Internal radial orifices 42 (FIG. 2) in end member 26 join the apertures 40 in fluid communication with pipe coupling 35. In the illustrated construction a gas, such as nitrogen, ideally dry and say at room temperature, is taken in at coupling 35 and migrates to the interior of housings 21 and 22 since apertures 40 open onto both sides of end member 26. Flow lines in FIG. 2 demonstrate this circulation.

The end faces of housing 21 are identical in construction. Therefore, angularly spaced holes (not visible in FIG. 3) in the opposite end face of housing 21 receive suitable screws (not shown) which enter or pass through axial holes 24' in end member 24. The attachment of end member 24 to housing 21 is thus the same as the attachment of end member 26 in this respect.

The multiple perforations in end member 24 may best be seen in FIGS. 6 and 7. Besides the mounting holes 24', the perforations include threaded center and outer holes 44 and 46, respectively. Holes 46 are equal in number to the holes 38 in end member 26 and are so positioned that, when secured to housing 21 in the manner described, the holes 46 and 38 line up with each other. Axial orifices 48, shown grouped in two in the present embodiment, are bored into end member 24 short of complete penetration. Each of these orifices communicates with a radial orifice 50 which opens onto the rim of end member 24. Orifices 50 create manifold exhaust ports whereby the gas admitted to housing 21 may find pressure relief and evacuation to atmosphere.

An electrically-insulating spacer 51 is disposed in housing 22 against a shoulder 22' (FIG. 2) and fastened against movement by screws 52. Angularly-spaced semicircular axial cavities 51' in spacer conform in position to the coaxially-aligned holes 38 and 46 in end members 26 and 24, respectively. A second electrically-insulating spacer 54 is disposed in housing 22 in spaced relationship to spacer 51. An embossment 54' on spacer 54 abuts against a second shoulder 22" in housing 22. Both spacers slide freely into and out of housing 22.

Spacer 54 is molded or otherwise prepared with a central substantially square cavity 55 (FIG. 3) which overlays four outer axial unthreaded holes 56 grouped symmetrically about a central axial threaded hole 58. The outer holes 56 line up with the holes 51' in spacer 51. A plug 60 of electrically insulating material is disposed against the base 55' of cavity 55. The exterior dimensions of cavity 55 and plug 60 conform essentially to each other so that a snug fit is obtained.

A brass plate 61 with a central opening 61' large enough to accommodate plug 60 is held against the end face 54" of spacer 54 by the downturned edge 28' on cap screw 28.

Figures 4, 5:
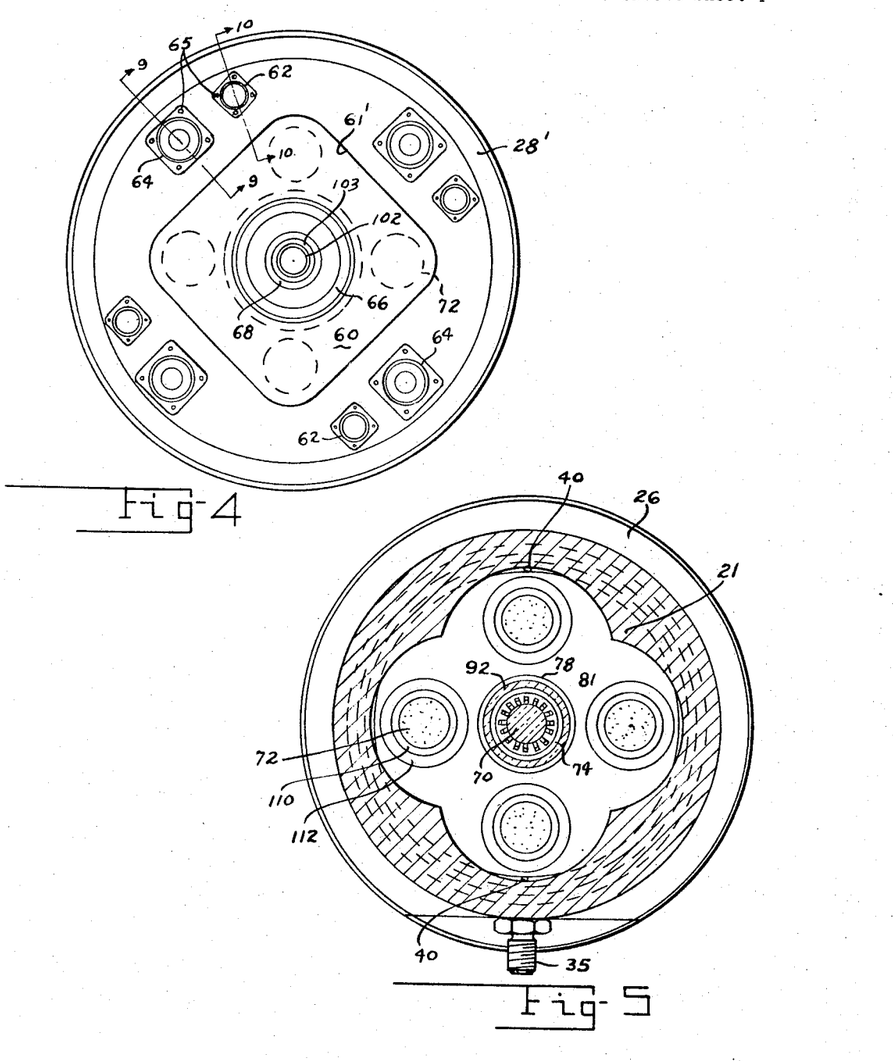
FIG. 4 is an end view looking at the device of FIG. 1 from the right, with the coaxial cables omitted.
FIG. 5 is a sectional view on the line 5—5 of FIG. 2.

Disposed on plate 61 in angular-spaced paired relationship are coaxial plugs 62 and 64, only two of which are shown in FIG. 3, for connection with coaxial cables 32 and 34. After the manner in FIG. 4, the outer or ground shell of each coaxial plug is electrically connected to plate 61, screws 65 being shown for this purpose.

A substantially tubular bushing 66, the shank 66' of which extends axially through plug 60, spacer 54, and spacer 51, in the order named, threadably engages opening 58 in spacer 54 sufficiently to abut plug 60 against the seat 55' of cavity 55 in spacer 54. This abutment between plug 60 and spacer 54 closes off one side of spacer 54 to atmosphere. In this respect, the interior of housing 22 is sealed against moisture-laden air. Since there is a requirement to vent the gas circulating in housing 22, bushing 66 in the wall thereof is transversely pierced by apertures 66" which deliver the gas entering housing 22 to an annular passageway 68 encircled by bushing 66. This circulating action, later to be discussed in more detail, is described by appropriate flow lines which escape through the head of bushing 66.

A solid crystal rod 70 of laser material, such as ruby (chromium doped corundum), is disposed at the center of housing 21 and extends to points more or less adjacent end members 24 and 26. The center of rod 70 coincides with a common focal line of a multiple-elliptical cavity best seen in FIG. 5 and defined by an essentially four-leaf clover internal configuration of housing 21. As directly will appear, pumping light from one or more flashlamps 72 is directed toward rod 70 to initiate the laser action.

Figure 8:
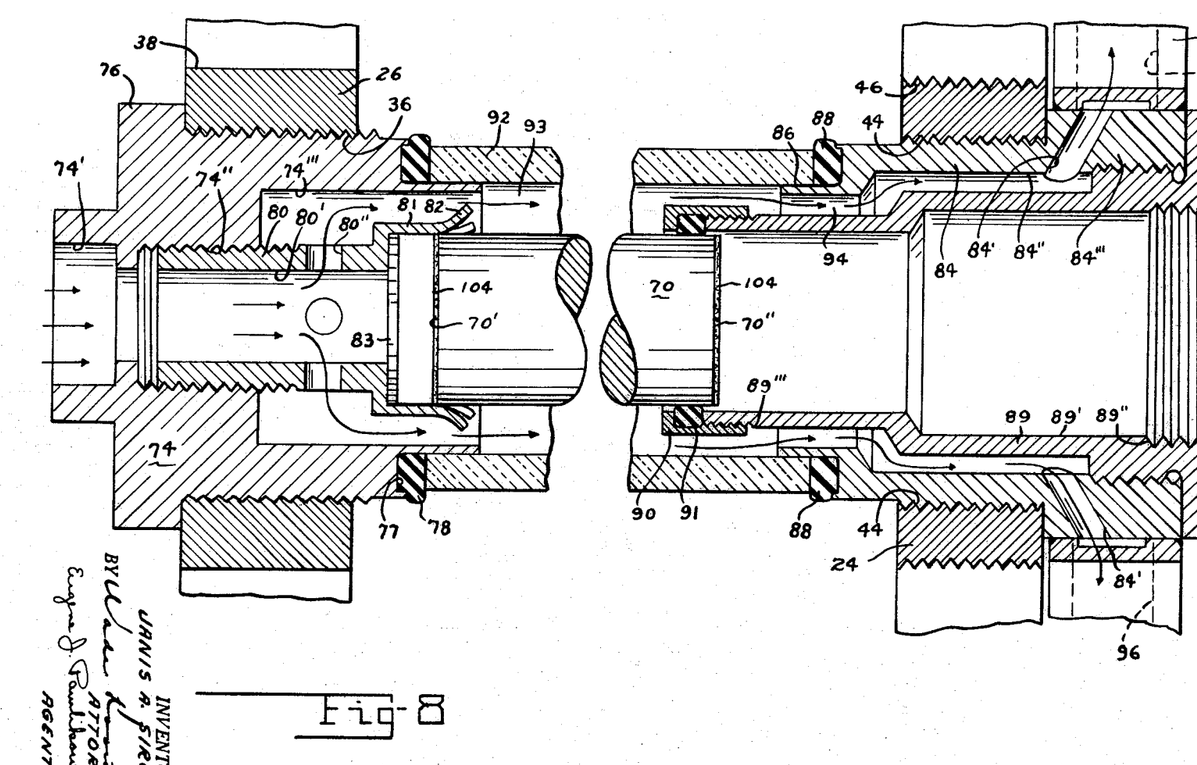
FIG. 8 is an enlargement of the laser rod, the tubular sleeve, and certain other parts shown in FIG. 3.

Referring now to FIG. 8 where the arrangement of rod 70 is more apparent, a hub member 74 with essentially tubular concentric bores 74', 74", and 74"' of slightly differing diameters is threaded into hole 36 of end member 26 until its flanged head 76 bears on end member 26. The inner end of hub member 74 tapers to a circumferential groove 77 which defines a seat on which a resilient O-ring cushion 78 is mounted. Threaded into hub member 74 is a small hub member 80 whose tubular bore 80' interconnects the bores 74' and 74"' in hub member 74 by means of transverse apertures 80". Relative to each other and to end member 26, hub members 74 and 80 are arranged in concentric relation.

A hollow cup 81 formed on the inner end of hub member 80 is notched circumferentially to provide resilient tabs 82 opposite ones of which spring sufficiently from each other to form a positive lock on one end of rod 710. The resiliency of the tabs provides a firm slip fit which will permit the rod to be removed conveniently from cup 81 when so desired and the replacement of the rod with minimum effort. The resiliency of the tabs 82 at the same time minimizes the pressure applied against the rod thereby reducing the danger of chipping or cracking the crystal material.

End face 70' of rod 70 is isolated from the bore 80' of hub member 80 by a shield 83 fixedly mounted at the base of cup 81.

Adjacent to the opposite end face 70" of rod 70, a hub member 84 in many respects similar to hub member 74 threadably engages hole 44 in end member 24. The wall of hub member 84 is perforated adjacent one end thereof with inclined apertures 84' which open on its bore 84" and the periphery of its flanged head 84'". The opposite or inner end of hub member 84 tapers to a circumferential groove 86 which serves as a seat for a resilient O-ring cushion 88.

Threaded into hub member 84 is a diametrically smaller but slightly longer hub member 89 having a tubular bore 89' terminating at one end in an internal thread 89" and at the other end in an external thread 89'" between which and a cap screw 90 an O-ring cushion 91 is firmly secured about the end face 70" of rod 70. It will be seen that with respect to each other and to end member 24, hub members 84 and 89 are arranged in concentric relation.

A clear tube 92 of glass, quartz, or suitable other material of similar transparency, jackets rod 70 between O-rings 78 and 88. The compression offered by O-rings 78 and 88 will check any overstraining at the ends of tube 92. Furthermore, the length of tube 92 is such that O-rings 78 and 88 are slightly compressed with the tube in place. Coolant leaks at these points are thereby prevented. Inasmuch as the inner diameter of tube 92 exceeds the diameter of rod 70, a chamber 93 of annular cross section is formed the length of rod 70 between it and the encircling tube.

Hub members 84 and 89 have such diametrical dimensions that between them there is formed a coolant outlet passageway 94 which feeds into the orifices 84' in hub member 84. Just above the orifices 84', disc member 27 is welded or otherwise secured to hub member 84 in spaced concentric relation to end member 24 such that four unthreaded holes 95 therethrough line up with corresponding ones of the holes 46 in end member 24. In order to extend the passageway 94 to a point outside device 20, disc member 27 is provided with radial orifices 96 (FIG. 8) which, following the attachment of disc member 27 to hub member 84, are fed by one of the inclined orifices 84'. It will be useful to consider the radial orifices 96 as extending internally along the spokes 98 which separate adjacent holes 95. The orifices 96 terminate adjacent the rim of disc member in a circumferential passageway 99 (FIG. 2) which empties into two 180°-spaced apart coolant outlet ports 100.

A coolant inlet tube 102 (FIG. 2) sleeved with a thermally insulating cladding material 103 is press fit or otherwise firmly entrenched into the cup-shaped bore 74' in hub member 74 and extends internally of bushing 66 concentric therewith. A transparent liquid coolant, such as a clear mineral oil of good heat conductivity, is admitted to the end of the tube 102 where it projects beyond bushing 66. For the sake of simplicity, no fluid source is shown, it being understood that any suitable connection to tube 102 will suffice.

End faces 70' and 70" are covered with a coating 104 which enhances internal reflection. Silver or a similar element of high reflectivity may be used. The coating on end face 70' is 100% reflective. The coating on end face 70" is reduced slightly, for example, to 98% reflectivity, leaving a transmission figure of 2%. The coherent laser output energy therefore emerges through end face 70" which corresponds to that end of housing 21 on which the radiation inscription appears.

Each of the elliptical cavities in housing 21 is provided with a flashlamp 72 whereby the rod 70 may be pumped simultaneously from virtually all directions. Whereas rod 70 is disposed at the common focal line, the flashlamps take up positions along the other focal lines of the multiple-ellipse configuration. For use as flashlamps, General Electric type GE FT 86 have been found to possess adequate intensity and efficiency. Each flashlamp contains axially-spaced high voltage and ground electrodes 105 and 106, respectively, connector straps 108 at both ends, and an ionizable gas such as xenon which, when ionized, produces a plasma-column diffusing light in all directions. Light emitted away from rod 70 is reflected from the highly polished elliptical surfaces and caused to travel toward the ruby rod.

No claim of patentable novelty is made herein for the use of multiple elliptical cavities having a common focal line, this approach to optical pumping being known in the art.

Figure 13:
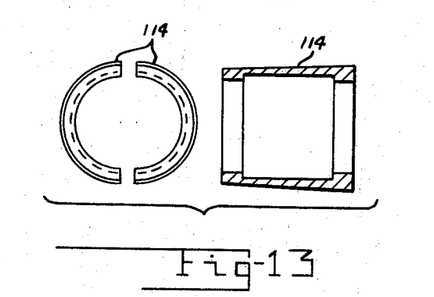
FIG. 13 shows two views of a collar used in the support of the flashlamps.
Figure 14:
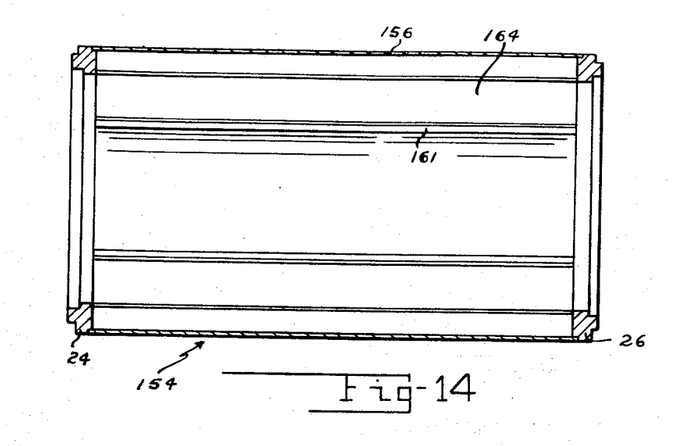
FIGS. 14, 15, 16 and 17 are views, showing the parts in different positions, illustrating a modified housing suitable for use with the laser device of FIG. 1.

Support for the flashlamps is provided by end members 24 and 26. Considering each flashlamp alone, the arrangement for the others being the same, the glass envelope is sleeved by an elastic cushion 110 pressed in place by a tubular electrical insulator 112 lodged firmly in one of the holes 38 in end member 26. At the other end member 24, the flashlamp passes through a tubular sleeve 113 tapered internally and threaded at both ends, one of which threadably engages the aligned opening 46 in end member 24. Internally disposed in the sleeve 113 is a collar 114 tapered to suit the internal design of sleeve 113. Collar 114 may be in halves, as is shown in FIG. 13. A resilient cushion 116 which may be of fiberglass is placed between the collar 114 and the glass envelope in encircling fashion.

A metal tubular cover 118 with open ends and a longitudinally-extending terminal post 118' threadably engages sleeve 114 and, in turn, threadably receives a metal cap nut 120 which covers terminal post 118'. Ground electrode 106 is directly connected to terminal post 118'. Taking advantage of the electrical conductivity of the various parts thus far described, it will be observed that between terminal post 118' at one end of device 20 and brass plate 61 at the opposite end of device 20, electrical conductivity exists over the path, reading from right to left in FIG. 2, terminal post 118', cover 118, sleeve 113, end member 24, housing 21, end member 26, housing 22, cap screw 28, and brass plate 61.

Figure 9:
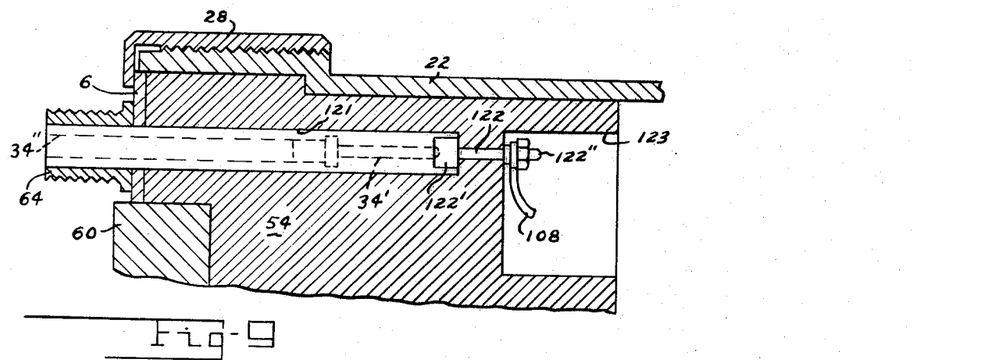
FIG. 9 is a fragmentary sectional view on line 9—9 of FIG. 4.

In FIG. 9, the high voltage connections for capacitor discharge into the flashlamps will now be described. This construction is the same for each flashlamp. Spacer 54 is provided with an axially-extending opening 121 beneath each coaxial plug 64. A metal pin 122 mounted at the base of the opening 121 includes a receptacle 122' and a terminal post 122", the strap 108 from one of the flashlamps being connected thereto. Assuming that the coaxial cable 34 is attached, the inner conductor 34' thereof, surrounded by an insulative sleeve 34" in the usual manner will engage receptacle 122'.

The undercut 123 on spacer 54 adjacent post 122" shields the high voltage strap 108 from the metal barrel of housing 22.

Figure 11:
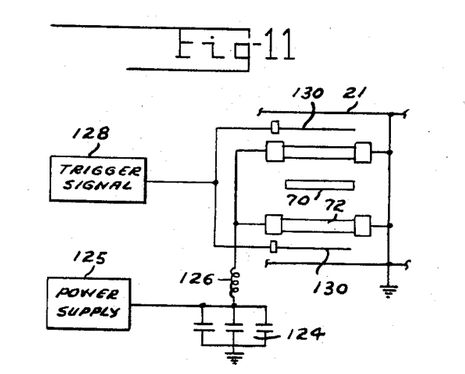
FIG. 11 is an equivalent circuit helpful in describing operative features pertinent to the invention embodiment.

The energy for ionizing the flashlamps may be provided as shown in FIG. 11, where a capacitor bank 124 charged by a suitable power supply 125 is coupled by a current limiting inductor 126 to the high voltage side of the flashlamps. In the present embodiment, it will be understood that coaxial plugs 64 are coupled to a capacitor storage bank, such as shown. The ground connection for the flashlamps is made from terminal post 118 to brass plate 61 over the path previously traced.

Figure 10:
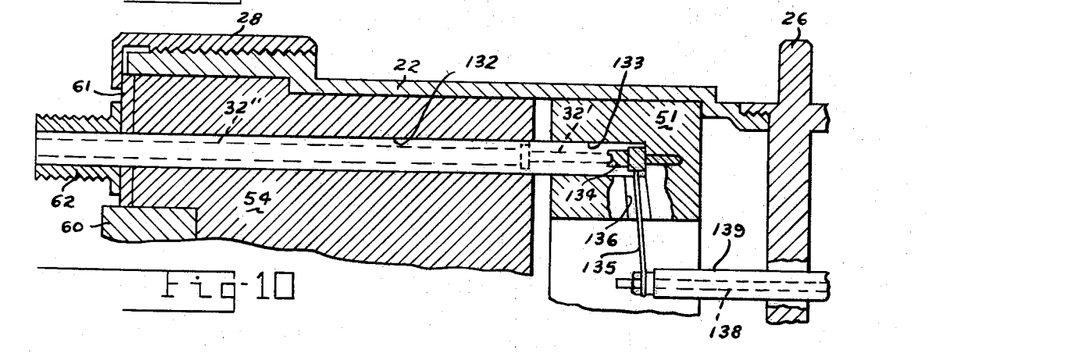
FIG. 10 is a fragmentary sectional view on line 10—10 of FIG. 4.

A trigger signal generator 128 feeds a trigger pulse to a trigger electrode 130 which initiates the laser action. With respect to the invention embodiment, the trigger pulse is simultaneously applied by means of coaxial cables 32 to each of the coaxial plugs 62 from whence an electrical connection to the trigger electrodes extends. To this end, as seen in FIG. 10, spacer 54 is provided with an axially-extending aperture 132 aligned with each coaxial plug 62. In turn, aperture 132 is aligned with an axial hole 133 provided in spacer 51. Mounted fixedly at the base of the hole 133 is a metal post which serves as a socket receptacle 134 to which a connector strap 135 is electrically secured. The strap 135 projects through an inclined aperture 136 in spacer 51 which leads internally from the hole 133 to the margin of the central cavity area of spacer 51. The holes 133 and one of the apertures 136 is also shown in FIG. 3.

Strap 135 is connected to one of four angularly-spaced terminal posts mounted on end member 26 (only one of which is shown in FIG. 3 for simplicity) and comprising the usual center conductor 138 and concentric electrical insulator 139. With the coaxial cable 32 attached to coaxial plug 62, the inner conductor 32' thereof, surrounded by an insulative sleeve 62" in the usual manner, will engage receptacle 134 thereby coupling the trigger pulse to center conductor 138.

Showing a triggering electrode actually positioned relative to its associated flashlamp is not feasible in the views taken. However, the actual arrangement of each target electrode and its companion flashlamp is identical to that shown in FIG. 11. Thus, it will be understood that a target electrode 130 is attached to the other side of each terminal post and in the completed assembly extends alongside the nearest flashlamp parallel thereto and sufficiently close to housing 21 to establish an electrical field therebetween for each triggering pulse applied. The ground return to brass plate 61 includes housing 21, end member 26, housing 22, and cap screw 28.

Operation

In operation, the coolant is continuously applied via inlet tube 102 and is collected at outlet ports 100. A coolant such as silicon oil may efficiently be cooled to about 200° K. Lower temperatures can be obtained using liquid nitrogen.

The coolant flows into and completely fills the annular passageway 93 until no fluid discontinuity exists between the inner wall of tube 92 and the exposed surface of rod 70. Firing is initiated by applying the trigger pulse simultaneously to trigger electrodes 130. An electric arc passes between housing 21 and the trigger electrodes and excites the xenon gas in the flashlamps to a partially conductive state. Capacitor bank 124 suddenly discharges across the gap separating the flashlamp electrodes 105 and 106, the current pulse being brief and intense. The discharge arc fully excites the internal gas into a plasma column of high temperature and intense energy. A portion of the optical energy generated by the discharge enters the rod 70 after passing through tube 93 and the coolant. The configuration of the reflecting multiple-ellipse cavities in housing 21 is such that little radiation from the flashlamps is lost.

The energy of the pumping radiation in rod 70 undergoes multiple reflection patterns and continues to grow on being reflected from the silvered end faces 70' and 70". The generated coherent light established in the rod emerges through the semitransparent end face 70", as in other laser rods having silvered end faces, and consists of an intense collimated beam with very narrow wavelength divergence.

The coolant maintains the temperature of the laser rod fairly constant thereby achieving better utilization of the crystal material. By this irrigation, the threshold rate at which pumping must be continued to obtain the same amount of output power is reduced. Moreover, dissipating less heat in the rod itself necessarily increases the output quanta.

The value of the combined overlay of the tube 93 and the coolant lies in the increased energy density of pumping radiation in the laser material. The refraction coefficient of tube 92 is selected to be $N_1$ and the refraction coolant of the coolant $N_2$, where $N_1 > N_2 > 1$. The product of the refractive indexes $N_1$ and $N_2$ produces a most desirable increase in lumen density on the active volume of rod 70, much like the focusing action of a parallel plate lens so that the excitation is laterally displaced into the crystal material more radially in comparison to systems where no such overlay is used.

The walls of the flashlamps are heated by the particle bombardment accompanying the ionization. The nitrogen gas admitted through pipe coupling 35 circulates about those portions of the flashlamps exposed in housings 21 and 22 and finally is vented through orifices 50 in end member 24 and passageway 68 under bushing 66. By adjusting the temperature and the rate of flow of the gas, frost formation on the outer surface of tube 92 is prevented.

In certain experimental tests, fractures were observed in the flashlamps in the area between the supporting structure offered by end members 24 and 26. Uncompleted studies reveal that resonance characteristics established in the flashlamps during generation of the plasma column may be responsible. The value of the resilient cushions 110 and 116 may therefore readily be appreciated. Also, the safety usefulness of insulator 112 between the high voltage electrode 105 and the metal body of end member 26 is apparent.

Various dimensions and parameters employed in the illustrated embodiment are as follows:

| | | |
|---|---|---|
| Tube 92, outside diameter | inches | 1.5 |
| Tube 92, inside diameter | do | 1.1 |
| Rod 70, diameter | do | 0.625 |
| Rod 70, length | do | 9.0 |
| Flashlamp rating, each | joules | 20000 |
| Capacitor bank | volts | 5000 |
| Trigger pulse | do | 10000 |
| $N_1$ | | about 1.6 |
| $N_2$ | | about 1.39 |

The wavelength observed for the laser output beam in experimental tests was 6943 A.

Other experimental investigation revealed the accumulation of frost on end face 70" due to the cryogenic state of the coolant. There is a requirement, however, to avoid frosting over the area from which the coherent light emerges. Accordingly, a preferred embodiment for this purpose includes moisture reduction means in fluid communication with end face 70" for impelling against it a transparent gaseous medium in quantity sufficient to purge the end face area of moisture condensation. The velocity of the gas current is suitably controlled to prevent erosion of the silvered layer 104. Moreover, moisture evaporation is achieved with no noticeable interference with the laser output beam.

Thus, in the embodiment according to the invention, and best seen in FIGS. 2 and 12, there is provided concentric tubular shells 142 and 144 coaxial with the common focal line. The outer shell, i.e., 142, threadably engages hub member 84. The inner shell 144 threadably engages shell 142 and extends internally thereof in the direction of the laser housing to a point adjacent to but short of the threaded portion 142' of shell 142. The diametrical dimensions of shells 142 and 144 are such to define an annular-shaped channel 146 to which the moisture reducer is introduced by means of intake port 148. Very dry nitrogen gas is acceptable for bathing end face 70".

Adjacent the downstream end of shell 144, an exhaust port is provided in the form of a tubular bushing 149 held in place by a transparent window 150 in turn forced against a shoulder 142" in shell 142 by a screw 152 threadably engaged with shell 142. Circumferentially-staggered radial apertures 149' in bushing 149 communicate with the interior of shell 144 and are arranged in positions facing one or more apertures 143, drilled through the wall of shell 142 to feed to atmosphere. Window 150 seals the interior of shell 144 against atmosphere without restricting passage of the laser output beam.

FIGS. 14 through 17 show a modification of housing 21, it generally being referenced 154. In this housing, four angularly-spaced rib sections 155 which extend the length of the housing form the support elements for arcuate-shaped cover plates 156. The surfaces 155' on the rib sections which receive the cover plates are arcuate to suit the contour thereof. When placed over the rib section and secured thereto, such as by screws 157 engaging tapped holes 158, a rigid cover is formed in the shape of a tubular shell.

The rib sections 155 extend axially of the shell and are tapered radially so as to form sloping edges 160 joined by a boss 161 which defines parallel ridges 162 on opposite sides thereof. An arcuate-shaped reflector 164 having its inner surface 164' of high reflectivity occupies each quadrant of housing 154. In the illustrated construction, the edges of each reflector interfit with the ridges 162 on bosses 161 to locate the reflectors relative to each other in a resonant cavity broken only by the tips of the bosses 161. The parts are so proportioned that the frictional attachment developed at the edges of the reflectors is sufficient to retain them firmly in place.

By removing the cover member above it, the reflector underneath can be taken out of the cavity with a radial motion. Hand grips, not shown, may be provided on the outer surface of the reflectors for this purpose. In one acceptable form, reflectors are made of silver plated brass plates.

Figure 15:
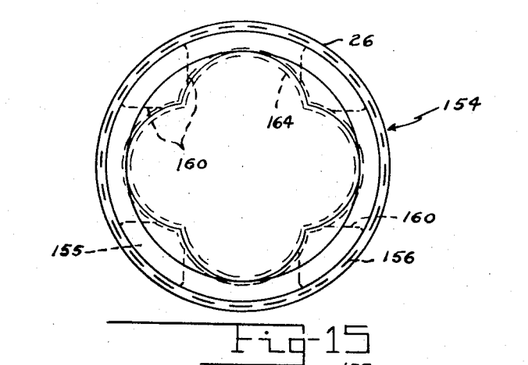
Figure 16:
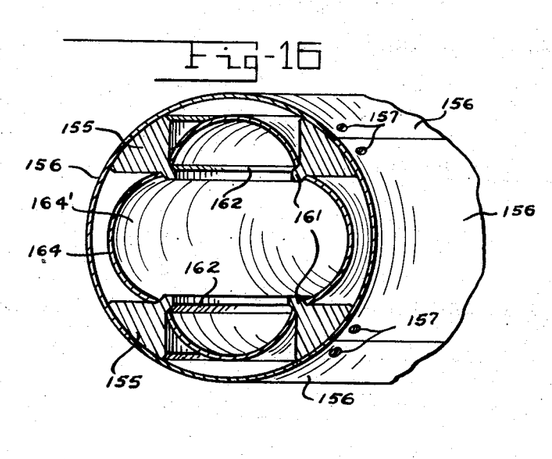
Figure 17:
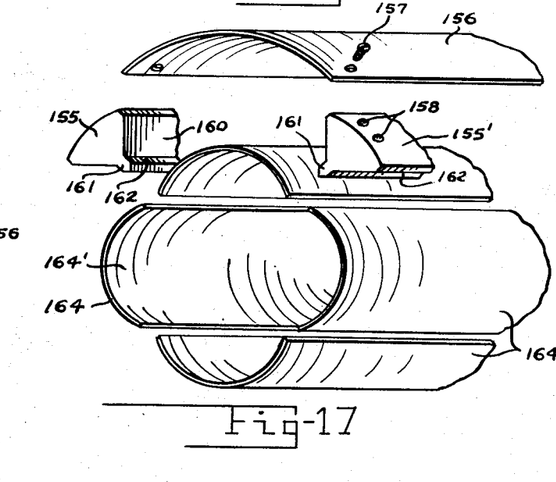

It will moreover be observed, particularly in FIG. 15, that the housing modification has the characteristics of a multiple ellipse and therefore can fulfill the previously expressed requirements regarding efficient irradiation of the laser rod.

It will be apparent to those skilled in the art that changes and other modifications may be proposed without departing from the spirit of the invention and the scope of the appended claims.

I claim:

1. A laser comprising a cylindrical housing of elliptical internal configuration, disc-shaped end members removably secured to said housing, each of said end members having a central threaded aperture therethrough coaxial with said housing, first hub members of tubular configuration threaded into said apertures and each having a shoulder abutment extending inwardly toward the center of said housing to define an annular seat, a resilient vibration damping ring on each of said annular seats, a transparent tube of predetermined diameter disposed within said housing in concentric relation and abutting on said rings so that stress forces against said tube when said end members are secured are relieved by partial compression of said rings, other hub members of tubular configuration removably connected to said first hub members and disposed inwardly of said first hub members in concentric relation, each of said other hub members including a rod-receiving bore disposed in spaced relationship relative to each other and extending into said tube in a direction along the tube axis, a solid crystalline rod capable of the stimulated emission of coherent light mounted in said rod-receiving bores and disposed at one focus of the elliptical cavity of said housing, reflective end coatings on said rod to enhance reflection in such manner that one end thereof is totally reflective and the opposite end affords egress to said coherent light, said rod being of diameter smaller than said predetermined diameter whereby a fluid-conducting chamber of annular cross section within said tube and about said rod is formed, means coupled to the ends of said chamber for circulating a transparent liquefied coolant over said rod, a flashlamp disposed at the other focus of the elliptical cavity of said housing for optically pumping said rod through said tube and said coolant, and gaseous means for cooling said flashlamp having inlet and exhaust connections with said end members.

2. A laser comprising a cylindrical housing of elliptical cross section, first and second disc-shaped end members removably secured to said housing, each of said end members having a threaded perforate center coaxial with said housing, first hub members of tubular configuration threaded into said end members and each having a circumferential groove adjacent the innermost portion thereof defining a seat, a resilient ring on each of said seats, a transparent tube of predetermined diameter and annular cross section disposed within said housing in concentric relation and abutting on said rings thereby obtaining a fluid sealing connection and pressure relief by partial compression of said rings when said tube is emplaced, other hub members of tubular configuration removably connected to said first hub members and disposed inwardly of said first hub members in concentric relation, each of said other hub members including a rod-receiving bore axially separated from each other and extending into said tube in a direction along the tube axis, a solid crystalline rod capable of the stimulated emission of coherent light mounted in said rod-receiving bores and disposed at one focus of the elliptical cavity of said housing, reflective end coatings on said rod so that one end thereof is totally reflective and the opposite end affords egress to said coherent light, said rod being in diameter smaller than said predetermined diameter whereby a fluid-conducting chamber of annular cross section within said tube and around said rod is formed, one of said other hub members being pierced axially to provide a coolant inlet connection joining one end of said chamber and the outside of said housing, said inner and outer hub member at the opposite of said housing having such diametrical dimensions that a coolant outlet connection joins the other end of said chamber fluidly to the outside of said housing, means connected to said coolant inlet and outlet connections for continuously circulating a transparent liquefied coolant through said chamber in direct contact with said rod, a flashlamp disposed at the other focus of the elliptical cavity of said housing for optically pumping said rod through the wall of said tube and said coolant, and gaseous means for cooling said flashlamp having inlet and exhaust connections with said end members.

3. A laser comprising a tubular housing having a cross section defining a plurality of elliptical cavities having a common focal line, disc-shaped end members removably connected to said housing, each end member having a threaded perforate center aligned with the axis of said housing and radially outward angularly spaced threaded apertures equal in number to said elliptical cavities, first hub members of tubular configuration threaded into the center of said end members and presenting at spaced points within the interior of said housing circumferential grooves each defining a seat, a vibration absorption ring on each of said seats, a transparent tube of annular cross section and predetermined diameter disposed within said housing in concentric relation and abutting on said rings, other hub members of tubular configuraton removably coupled to said first hub members in concentric relation and including a rod-receiving bore extending to the interior of said tube, a solid crystalline rod capable of the stimulated emission of coherent light mounted in said rod-receiving bores along said common focal line, the end faces of said rod being coated to achieve total internal reflection at one end and at the other end partial transparency which permits egress of said coherent light, said rod being diametrically smaller than said predetermined diameter and thus being surrounded by a chamber of annular cross section, one of said other hub members being pierced internally to provide a coolant inlet connection fluidly coupling one end of said chamber to space exterior to said housing, the hub members in removable coupling relation at the opposite end of said housing being of such diametrical proportion that an axial flow gap defining a coolant outlet connection fluidly coupling the other end of said chamber to space exterior of said housing is formed, means coupled to said inlet and outlet connections for continuously circulating a transparent liquefied coolant through said chamber against said rod, a flashlamp disposed at each other focal line of the elliptical cavities of said housing for optically pumping said rod through said tube and said coolant, said flashlamps including end portions extending through said angularly spaced apertures in said end members, means encircling said end portions of said flashlamps for mounting said flashlamps resiliently in said end members, and gaseous means for cooling said flashlamps including perforate inlet and exhaust connections in said end members.

4. A laser comprising a housing including a tubular outer wall and an internal configuration of elliptical cross section, disc-shaped end members removably connected to said housing and provided with a central threaded aperture in a plane normal to the axis of said housing, first tubular hub members threaded into said apertures including an internal thread and a portion defining an annular seat extending in a direction inwardly toward the center of said housing, resilient damping rings on said seats, a transparent tube of predetermined diameter and annular cross section abutting on said rings and disposed concentric with one focus of the elliptical cavity in said housing, second tubular hub members threaded into said first hub members in concentric relation and extending partly into said tube from opposite ends thereof to produce spaced holding means, one of said second hub members having a tubular configuration and the other of said second hub members being diametrically smaller than the first hub member into which it is threaded so that a continuous fluid-conducting passageway including the interior of said tube extends through said housing outwardly beyond said end members, a solid crystalline rod capable of the stimulated emission of coherent light disposed internally of said tube in axial alignment and mounted in said holding means releasably at one end thereof and fixedly at the opposite end thereof, whereby said rod is normally constrained to occupy the position axially aligned with said one focus but is removable endwise from said housing upon removing from said first hub member the one of said second hub members fixedly attached to said rod, said rod having high reflectance at the ends thereof and one end of sufficient transparency to permit the escape of said coherent light, the diameter of said rod being less than said predetermined diameter, means for circulating a liquefied transparent coolant through said passageway, and pump means disposed at the other focus of the elliptical cavity in said housing for optically pumping said rod through said tube and said coolant.

5. A laser comprising a housing including a tubular wall element and end members removably secured thereto, a tubular shell disposed inside said housing in concentric relation and coupled to and between said end members, a solid crystalline rod capable of the stimulated emission of coherent light disposed inside said shell in concentric spaced relation and cooperating with said shell to define a chamber of annular cross section within said shell and about said rod, means coupled to said end members for supporting said rod axially of said housing, cooling means in communication with said chamber through an inlet port in one of said end members and an exhaust port in the other of said end members for continuously circulating a liquefied transparent coolant through said chamber directly in contact with the surface of said rod, means disposed in the space defined between the inner wall of said housing and the outer wall of said shell for exciting oscillations in said rod productive of coherent light, gaseous source means in communication with said space for purging said space of moisture content thereby to prevent frosting of the outer wall of said tube, reflective coatings on the end faces of said rod to achieve total internal reflection at one end face and at the opposite end face partial transparency which permits the coherent light to escape, and moisture reduction means in fluid communication with said opposite end face for impelling against said opposite end face a transparent gaseous medium at a temperature sufficient to prevent the formation of moisture condensation.

6. A laser as claimed in claim 5, in which said moisture reduction means comprises a tubular outer shell removably secured to the one of said end members which is adjacent to said opposite end face of said rod, said tubular shell disposed in concentric relation with said rod, an inner tubular shell disposed inside said outer shell in concentric spaced relation, the space immediately adjacent said opposite end face of said rod being in communication with the space between the side walls of said shells and the interior of said inner shell, an inlet port in communication with the space between said side walls, an exhaust port communicating with the interior of said inner shell, and means coupled between said inlet and exhaust ports for generating a transparent circulating gaseous current of dry formation at a temperature sufficient to prevent the accumulation of frost on said opposite end face of said rod.

7. A laser comprising a housing including a central longitudinal reference axis and end members removably secured thereto, a laser rod disposed within said housing coaxial to said reference axis and including end faces reflectively coated such that one end face of said rod is totally reflective and the opposite end face is partially transparent to permit egress of coherent light, a transparent tube of annular cross section disposed about said rod in concentric relation with said housing and in spaced relation with said rod, means for circulating a coolant through the space defined by the separation between the periphery of said rod and the inner wall of said tube, means disposed within said tube for flashing said rod with radiation productive of coherent light in said rod, support means for the ends of said tube and said rod including a hub member of tubular configuration engaging said opposite end of said rod such that said partially transparent end face of said rod is exposed directly to the interior passageway of said hub member, a tubular outer shell removably secured to said hub member in concentric relation and mounted partially inserted into said hub member to effectively extend the interior passageway thereof in a direction away from said housing, a tubular inner shell mounted inside said outer shell and having one end disposed adjacent said partially transparent end of said rod and the opposite end removed outside said housing, a pane of transparent material impermeable to atmospheric pressure mounted into said opposite end of said inner shell such to block ingress of atmospheric pressure to the interior of said inner shell but offering unrestricted passage of said coherent light, and means coupled in fluid-conducting relation to the inner-wall space of said inner and outer shells and to the interior of said inner shell for circulating a transparent gaseous current of dry formation past said partially transparent end face of said rod whereby through moisture reduction formation of frost on said partially transparent end face is prevented.

8. In combination, a cylindrical rod of solid transparent material capable of the stimulated emission of coherent light through one end face thereof, a plurality of elongate reflectors of arcuate cross section encircling said rod over a major portion of its length and collectively being arranged to define multiple elliptical cavities having a common focal line coaxial with the longitudinal axis of said rod, a plurality of elongate arcuate-shaped cover members each overlying one of said reflectors and arranged circumferentially to define a segmented tubular shell concentric with said rod, means for optically pumping said rod disposed at the other focal line of each of said elliptical cavities, connector means angularly spaced about the inner wall of said shell for removably securing the abutting edges of said cover members against movement, and seat means depending from said connector means for frictionally holding said reflectors in said multiple-elliptical cavity configuration whereby upon removal of one of said cover members the reflector underlying it becomes accessible for removal by manually overcoming its frictional attachment to said seat means.

9. A laser comprising a solid crystalline body of cylindrical geometry capable of the stimulated emission of light, a reflective coating on the end faces of said body such that one end face thereof is totally reflective and the opposite end face affords egress to said coherent light, a transparent glass tube disposed about said body in concentric relation and having an inner diameter greater than the diameter of said body thereby to form a chamber of annular cross section around said body, a transparent liquid coolant of good heat conductivity circulating through said chamber, fluid inlet and outlet connection means communicating with said chamber for continuously passing said coolant over the portion of said body between said end faces, a housing of elliptical internal configuration disposed about said tube in spaced concentric relation and including end members removably secured thereto, flashlamp means disposed between said housing and said tube for optically pumping said rod with the irradiation passing through said tube and said coolant to reach said rod, said flashlamp disposed at one focus of the ellipse and said body at the other, the refractive index of said tube being $N_1$ and the refractive index of said coolant being $N_2$ where $N_1 > N_2 > 1$, said tube and said coolant effectively increasing the excitation of said body due to the refractive index product of said indexes $N_1$ and $N_2$, and means for cooling said flashlamp means.

References Cited

UNITED STATES PATENTS

| | | | |
|---|---|---|---|
| 2,531,533 | 11/1950 | Shaw | 339—56 |
| 2,565,064 | 8/1951 | Carlson | 339—56 |
| 3,210,687 | 10/1965 | Boyd et al. | 331—94.5 |

JEWELL H. PEDERSEN, *Primary Examiner.*

W. L. SIKES, *Assistant Examiner.*